United States Patent [19]
Fredell

[11] 3,800,137
[45] Mar. 26, 1974

[54] SIGNAL LIGHT ADAPTER

[75] Inventor: Gary D. Fredell, East Moline, Ill.

[73] Assignee: Gulf & Western Industries, Inc., New York, N.Y.

[22] Filed: Nov. 29, 1972

[21] Appl. No.: 310,389

[52] U.S. Cl............ 240/41 R, 240/41.3, 240/46.59, 340/84, 340/366, 340/383
[51] Int. Cl............................................. F21v 13/04
[58] Field of Search ........ 240/41, 41.1, 41.3, 46.59; 340/74, 84, 366, 382, 383

[56] References Cited
UNITED STATES PATENTS

| | | | |
|---|---|---|---|
| 3,457,400 | 7/1969 | Appeldorn | 240/41.3 X |
| 3,639,899 | 2/1972 | Ljungkull | 340/383 X |
| 3,245,075 | 4/1966 | Staats | 340/84 X |

Primary Examiner—Richard M. Sheer
Attorney, Agent, or Firm—Meyer, Tilberry & Body

[57] ABSTRACT

An adapter for a conventional signal light converts the conventional light into a programmable signal light such as that which appears to be illuminated only from selectively variable limited viewing areas. A housing, attachable to the frame of a conventional signal light, secures a transparent condensing lens and a transparent image plate, the latter having an image surface being located substantially at the focus of the former. A diffusing plate is releasably secured to the housing rearwardly of the image plate. The diffusing plate, which may be a combination color plate and diffusing plate, can be removed to provide easy access to the image surface so that one may view the image projected on the image surface. Selected areas on the image surface may be masked to block selected portions of the image plate. This programs the signal light so that illumination of the light may be seen only from within the area, forward of the light which correspond to the unmasked area seen on the image surface.

19 Claims, 13 Drawing Figures

PATENTED MAR 26 1974 3,800,137

SIGNAL LIGHT ADAPTER

BACKGROUND OF THE INVENTION

This application pertains to the art of signal lights and more particularly to an adapter for converting conventional signal lights into programmable lights, so that signal illumination is visible only in selected areas. The invention is particularly applicable to traffic lights and will be described with particular reference thereto. However, it will be appreciated that the invention has broader application and may be used with other forms of signal lights and beacons.

Signal lights of a known type include a condensing lens and a curved image plate located at the focus of the condensing lens. A light source behind the image plate illuminates the condensing lens. In previous arrangements, the image plate is also often coated or honed to act as a light diffuser so that the condensing lens will be fully and uniformly illuminated. In an arrangement of this type, an installer has difficulty viewing the image through the image lens because the diffusing coating blurs and obscures the image. In other arrangements, the condensing lens itself is colored the desirable color of the signal. Sunlight or vehicle lights reflecting off such a colored condensing lens gives a false indication that the signal is on. This false indication also defeats the purpose of the signal head since the signal appears illuminated when it is not illuminated and the false illumination appears to one's eye positioned within any area in front of the signal light. Other previous arrangements have used a special illuminating bulb having a diffusing coating on it. In some cases the special illuminating bulb and or the reflecting surface in the illumination cavity of the signal light is colored the desired color that the signal is expected to display.

SUMMARY

An adapter is attached to a conventional signal light and converts the conventional signal light into a programmable signal light, that is, one whose illumination can be seen only from a selectively variable limited viewing area within the normal area illuminated by the signal light or from which normal illumination of the signal light may normally be seen.

In accordance with one arrangement, the novel adapter of the present application includes an elongated hollow housing, which may be molded of synthetic plastic material, having openings at its opposite ends. A condensing lens is mounted in the front opening of the hollow housing. An image plate is mounted in the housing at its other end and with its image surface at the focus of the condensing lens. A diffusing plate is mounted at one of the openings so that the image plate is between the condensing lens and the diffusing plate. The diffuser plate, which may be a combination color plate and diffuser plate, is removably mounted in the housing so that the diffuser plate may be removed and provide viewable access to the image surface of the image plate. The image surface on the image plate may then be masked to selectively block off areas on the image plate, with optical tape, for example, so as to program the area from which illumination of the signal light may be seen. In those areas forward of the signal light, which correspond to the masked image, illumination of the signal light appearing on the condensing lens will not be visible to eye of a viewer.

It is a principle object of the present invention to provide an adapter assembly for converting conventional signal lights into programmable signal lights.

It is another object of the present invention to provide a programmable signal light having components which avoid providing false indications of illumination.

It is also an object of the present invention to provide an adapter assembly for converting a conventional signal light into a programmable signal light in which the adapter assembly is of very simple construction.

It is an additional object of the present invention to provide an improved programmable signal light having a clearly visable image on the image plate making programming of the programmable signal simple.

It is further an object of the present invention to provide an adapter assembly for converting a conventional signal light into a programmable signal light in which components of the adapter may be easily removed to provide easy access to the image surface on the image plate for providing ease of masking the image on the image plate for providing simple programmability.

BRIEF DESCRIPTION OF THE DRAWING

The invention may take form in certain parts and arrangements of parts, a preferred embodiment of which will be described in detail in this specification and illustrated in the accompanying drawing which forms a part thereof.

DESCRIPTION OF THE PREFERRED EMBODIMENT

Figure 1:
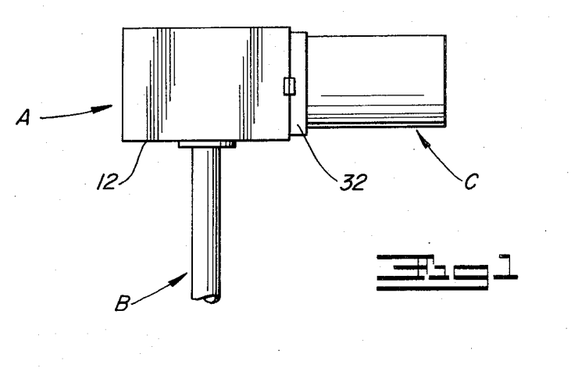
FIG. 1 is a side elevational view of a conventional signal light having the adapter of the present invention installed thereon.

Referring now to the drawings, wherein the showings are for purposes of illustrating a preferred embodiment of the invention only and not for purposes of limiting same, FIG. 1 shows a conventional traffic signal light or traffic signal head, A mounted on a supporting stancheon or post B. It will be recognized that the adapter assembly of the present invention can be used on signal lights which are mounted in any manner that traffic signals are conventionally mounted. Signal light A includes an enclosure 12 surrounding a light supporting cavity in which a reflector 14 is mounted by arms 16 and pins 18. Reflector 14 has opposite arms 20 receivable behind catches 22 which when attached secures the reflector 14 in the light supporting cavity. Reflector 14 may be adapted to mount a conventional light bulb 24 as used in conventional traffic signal lights or may be adapted to reflect light generated from a light bulb mounted in the cavity of the signal head. Electric power is supplied to bulb 24 through wires 26 and 28 connected to a suitable power source in a known manner.

Enclosure 12 of signal light A has a front cover 32 hingedly mounted thereto along one edge as at 34 and 36. Cover 32 includes an outwardly extending projection 38 having a slot 40 therein for receiving a threaded bolt 42 hinged as at 44 to enclosure 12 opposite hinges 34 and 36. A wing nut 48 threaded on bolt 42 bears against the outer surface of projection 38 for holding cover 32 in a closed position. Reflector 14 is normally pivoted inward with cover 32 closed.

Cover 32 has a centrally located circular opening 52 therein concentric with light bulb 24. A glass or plastic lens colored red, green or amber is normally mounted over opening 52 and cover 32 in a known manner.

In accordance with the present invention, the conventional lens which is normally mounted over openings 52 and cover 32 is removed and replaced by adapter assembly C. For mounting purposes cover 32 has a plurality of circumferentially-spaced holes therein outwardly of opening 52 for receiving screws or other fasteners 56 which project into holes in a rear wall of housing C.

Figure 3:
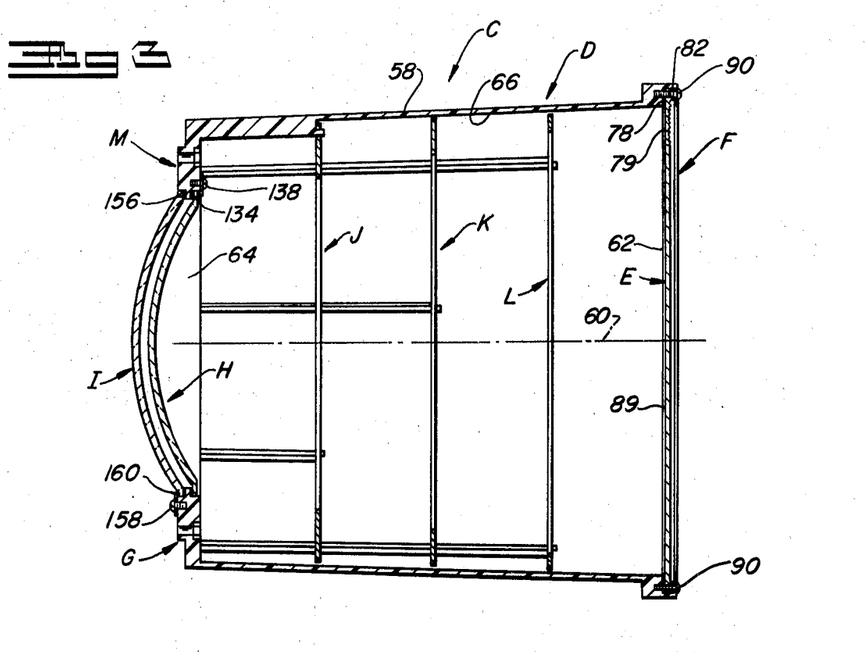
FIG. 3 is a cross-sectional elevational view of the adapter assembly of the present invention.

As seen in FIG. 3, adapter assembly C includes an elongated hollow housing D. having a solid cross-sectional configuration like a section of a gradually sloping cone. In accordance with a preferred arrangement, housing D is molded in one piece and may be molded of synthetic plastic material. In one arrangement, housing D is molded of a black polycarbonate synthetic plastic material.

Figure 4:
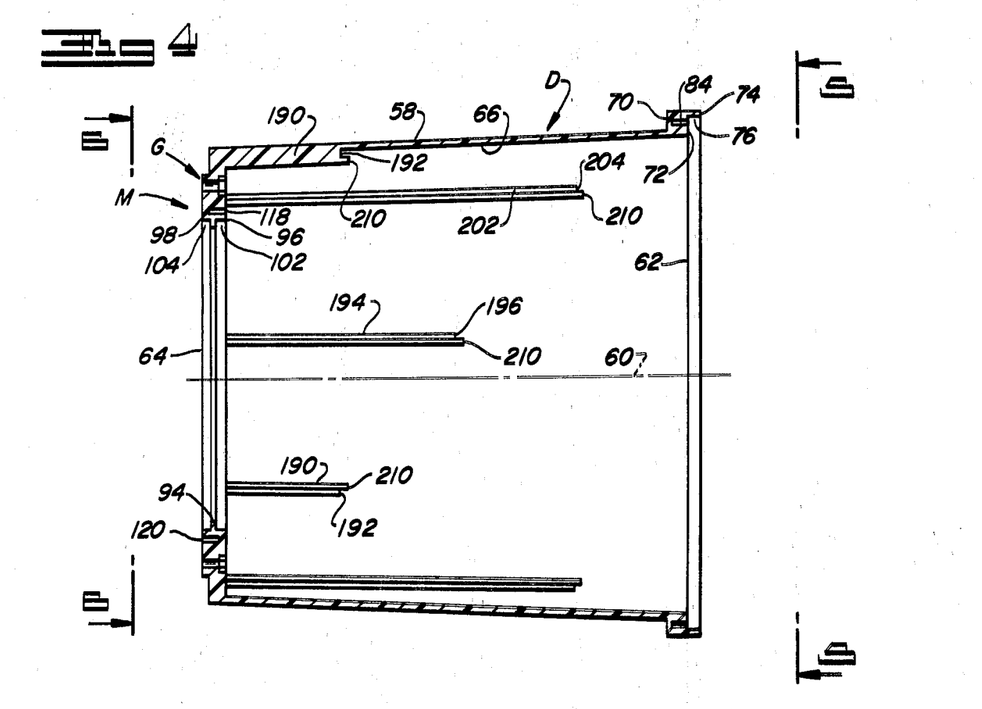
FIG. 4 is a cross-sectional elevational view of the housing used for the adapter assembly of FIG. 3.
Figure 5:
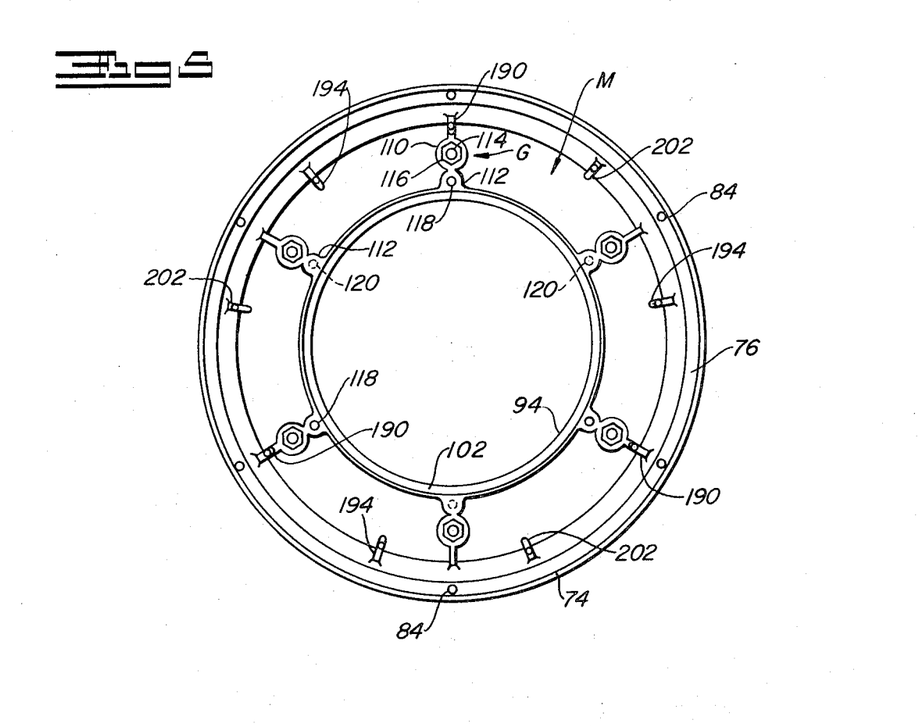
FIG. 5 is a front elevational view looking generally in the direction of arrows 5—5 of FIG. 4.

Housing D includes a peripheral wall 58 about a longitudinal axis 60. Housing D is open at its opposite end portions to provide a front opening generally indicated by numeral 62 and a rear opening generally indicated by numeral 64. Peripheral wall 58 has an inner peripheral surface 66 which is preferably of a matte finish.

Peripheral wall 58 of housing D is formed with a radially thickened circumferential portion 70 adjacent front opening 62. Thickened section 70 terminates adjacent inner peripheral surface 66 as at 72. The outer portion of thickened section 70 terminates radially and axially outward from termination 72 as at 74. This provides a circumferential front recess 76 around front openings 62 providing a mounting for receiving a neoprene gasket 78 and a condensing lens E.

Condensing lens E is in the form of a flat Fresnel or etchelon condensing lens of a known type having a series of concentric simple lens section to provide a thin lense with a short focal length and large diameter. That is, one surface 79 of lens E has a plurality of radially spaced circumferential grooves formed therein to provide a radially extending series of light refracting prism ridges at increasing distances from the center of the lens. In the preferred arrangement, lens E is positioned with its grooved surface 79 facing outwardly from housing D. An additional neoprene gasket 82 is positioned over the peripheral edge of lens E and a transparent cover plate F. is positioned with its peripheral edge in contact with neoprene gasket 82. Lens E and cover plate F both have peripheral edge portions thereof received within circumferential front recess 76. Thickened section 70 is formed with a plurality of circumferentially spaced holes 84 for receiving screws or other fasteners to hold lens E and cover plate F securely in position over opening 62.

Figure 7:
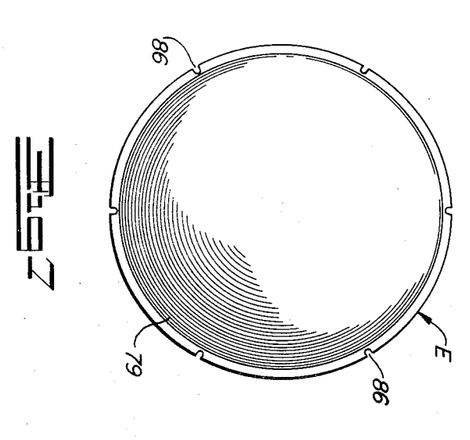
FIG. 7 is an elevational view of a condensing lens used in the assembly of FIG. 3.
Figure 8:
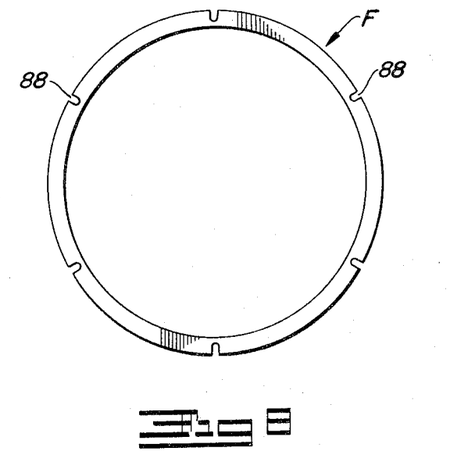
FIG. 8 is an elevational view of a cover plate used in the assembly of FIG. 3.

As shown in FIG. 7, condensing lens E has a plurality of circumferentially spaced slots 86 in its outer peripheral edge. As seen in FIG. 8, cover plate F has a plurality of circumferentially spaced slots 88 in its outer peripheral edge. Slots 86 and 88 are alignable with one another and with circumferentially spaced holes 84 so that screws 90 may extend through slots 86 and 88 into holes 84. Screws 90 have enlarged heads for bearing against the outer surface of the outer peripheral portion of cover plate F. Washers or other bearing means may be positioned between the screw heads and the outer surface of cover plate F. Gaskets 78 and 82 may also have slots in their outer peripheral edges similar to those at 86 and 88 on condensing lens E and cover plate F.

In the preferred arrangement, both condensing lens E and cover plate F are of clear, colorless transparent material such as clear optical grade Plexiglass V acrylic plastic as available from Rohm and Haas Company. Equivalent material having equivalent optical clarity may also be used. In one arrangement, condensing lens E has a total diameter of around 11.687 inches and a total diameter across its grooved surface of around 11 inches. The focal length is 12.5 inches from the smooth side 89 of lens E and there are 45 grooves per inch in surface 79 of the lens.

Housing D. has a circumferential rear wall M projecting toward axis 60 from peripheral wall 58. Rear wall M terminates in circumferential edge 94 spaced outwardly from longitudinal axis 60. Circumferential edge 94 defines the periphery of rear opening 64.

Radially outward from circumferential edge 94, rear wall M has inwardly and outwardly extending circumferential projections 96 and 98 extending substantially parallel to longitudinal axis 60. This provides an inner circumferential recess 102 between projection 96 and circumferential edge 94 and circumferential recess 104 between projection 98 and circumferential edge 94.

Figure 6:
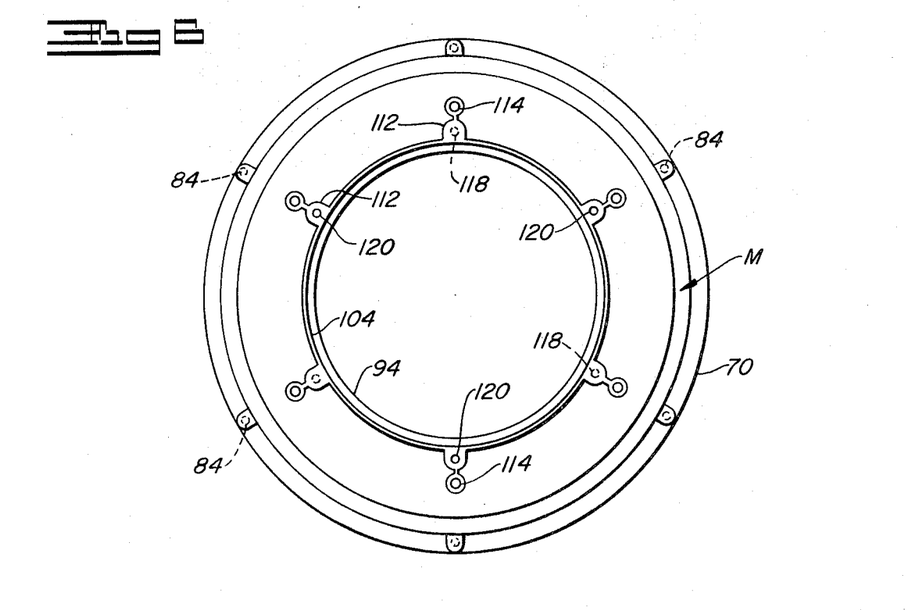
FIG. 6 is a rear elevational view looking generally in the direction of arrows 6—6 of FIG. 4.

Rear wall M is also formed with a plurality of circumferentially spaced enlarged and thickened boss portions G. In the arrangement shown, there are six of such boss portions G, although any suitable number may be provided. Each boss portion G includes a first boss portion 110, which defines an attaching means for attaching housing D to cover 32, and boss portions 112 for separately securing an image plate, and a combination color and diffuser plate, over rear opening 64. Enlarged boss portions 110 have holes 114 therethrough and threaded nuts 116 are molded thereinto. Boss portions 112 have bores 118 extending inwardly from the interior of housing D. The other alternate boss portions 112 have bores 120 extending inwardly from outside the housing D.

Figures 9, 10, 11, 12, 13:
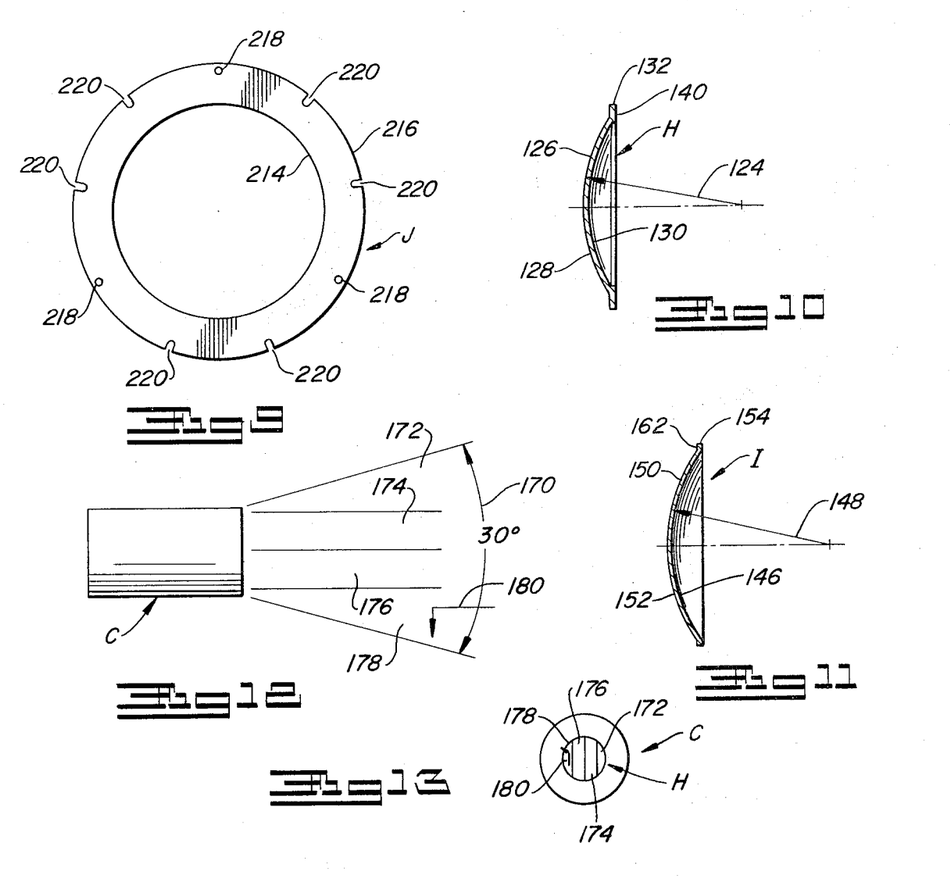
FIG. 9 is an elevational view of a baffle member used in the assembly of FIG. 3.
FIG. 10 is a side, cross-sectional elevational view of the image plate used in the assembly of FIG. 3.
FIG. 11 is a side, cross-sectional elevational view of the diffuser plate used in the assembly of FIG. 3.
FIG. 12 is a plan diagrammatical illustration showing the area in which the signal from the adapter of the present invention is visible.
FIG. 13 is a rear elevational view looking through the image plate of the adapter assembly of the present invention and showing how the viewing area in FIG. 12 can be limited.

Front and rear openings 62 and 64 in housing D are concentric with longitudinal axis 60. A transparent image plate H, formed of clear Pyrex glass or equivalent material, is mounted over rear opening 64. Image plate H has a spherical radius 124 to its outer convex surface 126 of around 5.7 inches. Image plate H has a spherical wall 128 which is around 3/16 inch thick perpendicular to outer convex surface 126 and inner concave surface 130. Image plate H includes an outwardly extending circumferential flange portion 132 receivable within inner circumferential recess 102. A neoprene gasket or the like 134 may be positioned within recess 102 before image plate H.

Housing D is dimensioned so that rear convex surface 126 of image plate H will be located at the focus of condensing lens E when image plate H is installed in position within inner recess 102 thereby forming an image surface. A plurality of screws 138 are threaded into holes 118 of boss portions 112. Substantially L-shaped bearing devices are positioned beneath screws 138 to have the end of their short leg bearing against surface 140 on image plate H for securing image plate H within circumferential recess 102.

A diffuser plate I, which may be colorless or may be a combination color and diffuser plate is positioned over rear opening 64 rearwardly of image plate H. The combination color and diffuser plate I may be formed of red, green or amber Pyrex glass or equivalent material. Combination color and diffuser plate I is translucent and has a chromaticity conforming to the Institute of Traffic Engineers technical specifications. Inner concave surface 146 of plate I has a spherical radius 148 of around 5.7 inches. Image plate I has a wall 150 whose thickness between concave inner surface 146 and outer convex surface 152 is around 3/16 of an inch measured perpendicular to surfaces 146 and 152. Inner surface 146 of plate I is frosted in a known manner, as with number 120 abrasive or the like. Inner surface 146 may also be frosted or honed in other ways so that plate I will act as a light diffuser. Plate I has an outwardly extending circumferential flange 154 receivable within outer circumferential recess 104 over a circumferential neoprene gasket or the like 156. Screws 158 are threaded into bores 120. Substantially L-shaped plate members 160 are positioned beneath the heads of screws 158. The terminal ends of the short legs of bearing plates 160 bear against outer surface 162 on flange 154 of plate I for securely and removably holding plate I in position on rear wall 156 of housing D.

Figure 2:
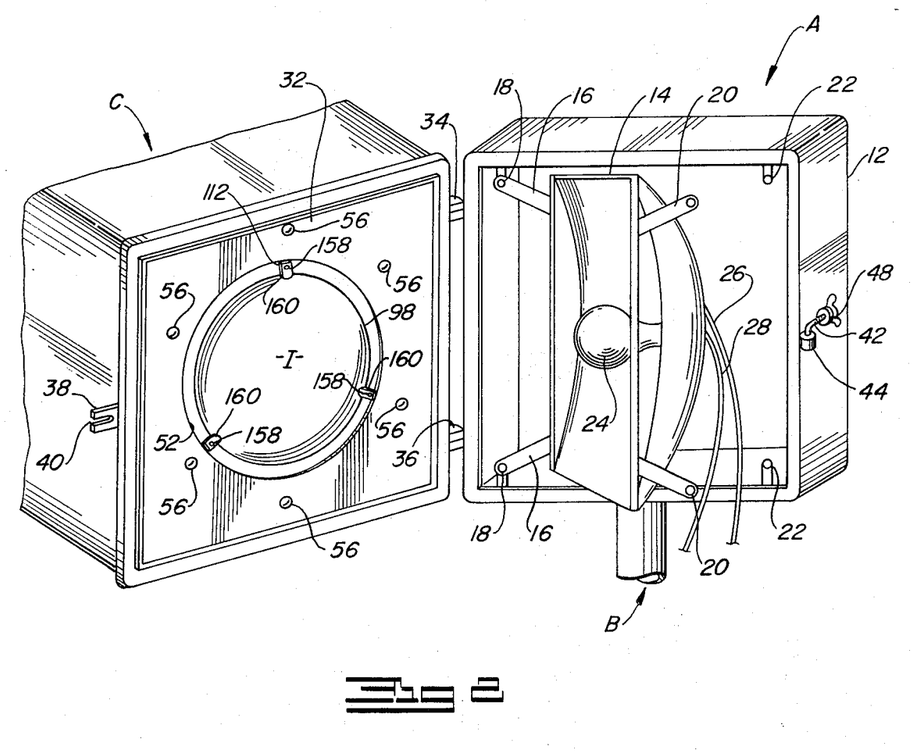
FIG. 2 is a perspective illustration of an opened conventional signal light having the adapter of the present invention installed thereon.

As shown in FIG. 2, peripheral edge 98 of rear opening 64 has a diameter substantially smaller than the diameter of opening 52 in cover 32. Therefore, enlarged boss portions 110 are alignable with the circumferentially spaced holes in cover 32 so that screws 56 may be threaded into nuts 114 for securely mounting adapter housing C to cover 32. The housing is dimensioned so that smaller boss portions 112 are accessible through opening 52 in cover 32 after adapter housing C is installed thereon. Screws 158 which hold plate I to housing D are then accessible from the rear of cover 32 when it is opened.

With the assembly installed as described, light bulb 24 and the associated reflector 14 will direct a light beam on to the diffuser plate I and the diffused light will illuminate the unblocked image on the image surface of the image plate H. If the diffuser plate is colored, the diffused light illuminating the programmed image surface will be colored. The image and the colored diffused light from the image plate will be projected over the entire area of the condensing lens E and the condensing lens F will appear illuminated to the eyes of any person within the field corresponding to the unmasked section of the image.

It will be recognized that signal light A may be tilted from the vertical so that longitudinal access 60 of adapter housing C extends upward or downward from the horizontal. With the assembly installed and bulb 24 lit, an image on condensing lens E will be visible as shown in FIG. 12 over a total arc 170 of around 30°. For purposes of illustration, lines have been provided in FIG. 12 to show traffic lanes 172, 174, 176 and 178 of a vehicular roadway. In the arrangement shown, the signal when illuminated, would appear illuminated on condensing lens E to a person positioned in any portion of the traffic lanes imaged on the image plate H. It may be desirable to have the image viewable only from lane 178 which may be a left turn lane as shown by arrow 180. In such case, one would simply open cover 32 and loosen signal light A on its mounting B. Enclosure 12 may then be rotated 90°. The screws 158 and bearing devices 160 would be loosened and relieved in order to remove the combination color and diffuser plate I from over rear opening 64. A clear and very sharp image on image plate H as shown in FIG. 13 could then be seen. The image seen on the image surface is reversed and inverted from the actual roadway. Optical masking tape may then be placed over areas 172, 174 and 176 of image plate H, leaving the image of lane 178 clear or unmasked. Once cover 32 is closed and the bulb 24 is illuminated the entire surface of the condensing lens E will appear illuminated only from lane 178. This is because all light which reaches the eye of a person within lane 178 originates from the area on image plate H, at which the image of his eyes would be seen. The area on which a persons eyes would then be seen in lane 178 on image plate H has been left unmasked so that a person in that lane is the only one who can see the image on condensing lens E. To persons in lanes 172, 174 and 176 the signal light will appear unilluminated because those areas of image plate H on which their eyes would appear have been masked. Naturally, the combination color and diffuser plate is replaced after the image surface of the image plate H has been masked.

The arrangement described, with quick removability of combined color and diffuser plate I, provides easy access to and a clear image of areas to be masked or programmed. It will be recognized that selective masking in limited areas may be done to serve any suitable purpose. An upper or lower portion of image plate H may be masked so that illumination signal would be visible only to drivers in a defined area or range of the roadway.

In accordance with another aspect of the device, inner peripheral surface 66 of peripheral wall 58 on housing D is provided with a plurality of longitudinally extending ribs which extend substantially parallel to longitudinal axis 60 and project radially inward toward longitudinal axis 60 from inner peripheral surface 66. A first set of three circumferentially spaced ribs 190 is provided. First set of ribs 190 have terminal ends as at 192 all lying in a common plane perpendicular to longitudinal axis 60 spaced a first distance from rear opening 64. A second set of circumferentially spaced ribs 194 are also provided. Second set of ribs 194 are three in number and have terminal ends 196 lying in a common plane perpendicular to longitudinal axis 60, and spaced a second distance greater than the first distance from rear opening 64. A third set of circumferentially spaced ribs 202 are provided and have terminal ends 204 lying in a common plane perpendicular to longitudinal axis 60 at a third distance greater than the first and second distances from rear opening 64. Each rib 190, 194 and 202 includes a projection 210 extending beyond terminal ends 192, 194 and 204, and spaced radially inwardly from inner peripheral surface 66 of peripheral wall 58 on housing D.

A plurality of baffles are provided for mounting within housing D in cooperation with ribs 190, 194 and 202. FIG. 9 shows a first baffle member J which is circular, having inner and outer peripheral edges 214 and 216. Baffle member J is formed of or is coated with a light absorbing substance. In the arrangement shown, the central opening through baffle J has a diameter of around 7-5/8 inches, and an outer diameter of around 10-3/8 inches. Baffle J defines a first baffle which is receivable within housing D. Baffle J has three circumferentially spaced holes 218 therethrough of slightly larger diameter than projections 210 on ribs 190. The projecting length of projections 210 is also somewhat greater than the thickness of baffle J. Baffle J also has a plurality of radially extending slots 220 in its outer periphery for receiving ribs 194 and 202. The width of slots 220 is slightly greater than the width of ribs 194 and 202 so that baffle J may slide into housing D for positioning holes 218 over projections 210 on ribs 190. Baffle J may be further secured within housing D by applying adhesive to ends 192 of ribs 190 or by placing snap-on fasteners over the portions of projections 210 which extend through holes 218.

An additional baffle K is mountable on projections 210 at end portions 196 or ribs 194 in the second set of ribs. Baffle K is constructed similarly to baffle J and only its dimensions are different. Baffle K may have an internal opening of 8-3/4 inches and an outer diameter of 10-9/16 inches. In addition, the outer periphery of baffle K has only three slots like those at 220 in baffle J for receiving ribs 202.

A third baffle L is also constructed similarly to baffles J and L. However, baffle L requires no slots like those at 220 in its periphery because it does not have to pass any ribs. Baffle L. has an internal diameter of around 9-7/8 inches and an external diameter of around 10-3/4 inches. The openings through baffles J, K and L increase in diameter when proceeding from image plate H toward condensing lens E. The baffles and the internal periphery of housing D are all colored, coated or made of a material to absorb light. Therefore, any sunlight or external light passing through condensing lens E will be substantially absorbed within housing D and prevented from reaching image plate H. Any light reaching image plate H will be of extremely low intensity. Therefore, a false indication that the signal is lighted is substantially minimized.

In the arrangement described, image plate H has a total diameter of around 7-3/32 inches, and the diameter of its inner concave surface 130 is around 6-1/2 inches. Combination color and diffuser plate I has a total diameter of around 7-3/32 inches, and a diameter at its inner concave surface 146 of around 6-35/64 inches.

Although the invention has been described with respect to a preferred embodiment, it is obvious that equivalent alterations and modifications will occur to others skilled in the art upon the reading and understanding of this specification. The present application includes all such equivalent alterations and modifications and is limited only by the scope of the claims.

What is claimed is:

1. A signal light comprising;
   a elongated hollow housing having a longitudinal axis, said housing having open opposite end portions for defining a front opening and a rear opening and having an internal peripheral surface,
   a condensing lens defining a viewing surface mounted in said front opening,
   an image plate having an image surface mounted in said rear opening, said image surface of said image plate positioned substantially at the focus of said condensing lens,
   a diffusing plate removably secured to said housing positioned adjacent to and behind said image surface of said image plate whereby said diffusing plate may be removed from said housing for exposing said image surface of said image plate for observing the image projected on said image surface from said condensing lens and
   a plurality of spaced-apart baffles projecting toward said longitudinal axis from said internal peripheral surface, each of said baffles being positioned between said image plate and said ondensing lens for providing a plurality of baffle openings.

2. A signal light as defined in claim 1 wherein said baffle openings of said baffles so projecting toward said longitudinal axis from said peripheral surface increases in diameter in a direction from said image plate toward said condensing lens.

3. A signal light as described in claim 2 wherein said internal peripheral surface of said housing and said baffles are light absorbing.

4. A signal light as defined in claim 1 wherein said baffles project toward said longitudinal axis in a plane perpendicular to said axis.

5. A signal light comprising;
   an elongated hollow housing having a longitudinal axis and an internal peripheral surface, said housing having open opposite end portions defining a front opening and a rear opening,
   a transparent condensing lens defining a viewing surface mounted in said front opening,
   a transparent image plate mounted in said rear opening, said image plate having an image surface located substantially at the focus of said condensing lens,
   a combination color and diffusing plate removably secured to said housing positioned adjacent to and behind said image plate, said color and diffusing plate being removable from said housing for exposing the image surface of said image plate for viewing the image projected on said transparent image plate from said transparent condensing lens and for according access to said image surface for masking selected areas on said image surface for blocking selected portions of the image appearing thereon for limiting the area within which said condensing lens will appear illuminated from outside said housing and, a plurality of spaced-apart baffles projecting toward said longitudinal axis from said internal peripheral surface, said baffles being positioned between said image plate and said condensing lens to provide a plurality of baffle openings between said image plate and said condensing lens.

6. A signal light as described in claim 5 wherein said baffle openings of said baffles projecting toward said longitudinal axis from said internal peripheral surface increased in diameter from said image plate toward said condensing lens.

7. A signal light as described in claim 5 wherein said internal peripheral surface of said elongated housing and said baffles projecting from said internal peripheral surface are light absorbing.

8. A signal light as defined in claim 5 wherein said elongated hollow housing having a longitudinal axis and an internal peripheral surface has a peripheral wall and a circumferential rear wall projecting toward said longitudinal axis from said peripheral wall and terminating outward from said longitudinal axis in a peripheral edge defining said rear opening, an inner circumferential recess in said rear wall adjacent said peripheral edge, an outer circumferential recess in said rear wall adjacent said peripheral edge, said rear wall having inner and outer surfaces, said combination color and diffusing plate and said image plate each having peripheral edge portions, outer securing means on said outer surface of said rear wall for releasably securing said peripheral edge portion of said combination color and diffusing plate in said outer recess, and inner securing means on said inner peripheral of said rear wall for securing said peripheral edge portion of said image plate in said inner recess.

9. A signal light as defined in claim 8 and further including mounting means on said outer surface of said rear wall for mounting said housing to a support frame.

10. A signal light as defined in claim 9 and further including a plurality of circumferentially spaced ribs extending substantially parallel to said longitudinal axis of said housing and projecting towards said longitudinal axis from said inner peripheral surface, said ribs being at least two rib sets and each rib set having a plurality of ribs, one of said rib sets having terminal rib ends located a first distance from said rear opening said front opening, the other of said rib sets having terminal rib ends located a second distance and greater than said first distance from said rear opening toward said front opening and attaching means on said rib ends for attaching said baffles to said ribs within said housing in spaced-apart relationship.

11. A signal light as defined in claim 10 wherein said rib ends include projections extending substantially parallel to said longitudinal axis and spaced inward from said inner peripheral wall toward said longitudinal axis.

12. A signal light as defined in claim 11 and further including baffles attached to said rib ends, a first said baffles having a plurality of circumferentially spaced holes therein receiving said projections on said rib ends of said one rib set and having outer slots receiving said ribs of said other rib sets, a second of said baffles having a plurality of circumferentially spaced holes therein receiving said projections on said rib ends of said other rib sets.

13. A signal light as described in claim 12 wherein said housing includes a peripheral front recess adjacent said front opening and said condensing lens has a peripheral edge portion receiving in said front recess, and securing means on said housing adjacent said front recess for securing said peripheral edge portion of said condensing lens in said front recess.

14. A signal light as defined in claim 5 wherein said combination color and diffusing plate and said image plate are curved, and further including outer securing means on said housing for releasably securing said combination color and diffusing plate over said rear opening outside of said housing and inner securing means for securing said image plate over said rear opening inside of said housing.

15. A signal light as defined in claim 5 wherein said baffles project toward said longitudinal axis in a plane perpendicular to said axis.

16. An adapter for converting a standard signal light head into a programmable signal light head including;
an elongated hollow housing having a longitudinal axis, said housing having open opposite end portions defining a front opening and a rear opening and having an internal peripheral surface means for mounting said housing onto said signal light head so that the light from said signal light head is directed toward said rear opening and passes through said elongated housing and out said front opening, a condensing lens mounted in said front opening and defining a viewing surface, a light diffusing means mounted in said housing adjacent said rear opening for diffusing light directed into said rear opening and passing through said elongated hollow and out said front opening, an image plate having an image surface located substantially at the focus of said condensing lens, said image plate positioned in front of said diffusing means and within the said light having passed through said light diffusing means means for removably mounting said light diffusing means in said housing for providing easy access to said image surface of said image plate and means for masking at least a portion of said image surface of said image plate for programming the diffused light passing through said housing and said condensing lens a plurality of spaced baffles projecting toward said axis from said peripheral surface, said baffles having openings therein and positioned between said condensing lens and said image plate, said openings progressively diminishing in size as each successive spaced baffle position approaches said image plate.

17. An adapter for converting a standard signal light head into a programmable signal light head as in claim 16 and in which the said condensing lens mounting in said front opening is transparent condensing lens, and said adapter further includes a clear cover lens for covering the exterior surface of said condensing lens.

18. An adapter for converting a standard signal light head into a programmable signal light head as in claim 16 and in which said condensing lens mounted in said front opening is a transparent condensing lens, said image plate positioned within the light beam is a transparent plate and said light diffusing means is a combination color and diffusing means.

19. A signal light as defined in claim 16 wherein said baffles project toward said longitudinal axis in a plane perpendicular to said axis.

* * * * *